(12) United States Patent
Colvin et al.

(10) Patent No.: US 10,332,219 B2
(45) Date of Patent: Jun. 25, 2019

(54) SYSTEMS AND METHODS FOR DETERMINING OPTIMUM PLATFORM COUNT AND POSITION

(75) Inventors: Dan Colvin, Dripping Springs, TX (US); Gary Schottle, Sugar Land, TX (US)

(73) Assignee: Landmark Graphics Corporation, Houston, TX (US)

( * ) Notice: Subject to any disclaimer, the term of this patent is extended or adjusted under 35 U.S.C. 154(b) by 2242 days.

(21) Appl. No.: 12/413,770

(22) Filed: Mar. 30, 2009

(65) Prior Publication Data
US 2010/0250302 A1    Sep. 30, 2010

(51) Int. Cl.
*G06Q 50/02* (2012.01)
*G06Q 10/06* (2012.01)

(52) U.S. Cl.
CPC ............. *G06Q 50/02* (2013.01); *G06Q 10/06* (2013.01); *G06Q 10/06313* (2013.01)

(58) Field of Classification Search
None
See application file for complete search history.

(56) References Cited

U.S. PATENT DOCUMENTS

| | | | |
|---|---|---|---|
| 6,549,879 B1 * | 4/2003 | Cullick et al. | 703/10 |
| 7,200,540 B2 | 4/2007 | Colvin et al. | |
| 7,546,228 B2 * | 6/2009 | Cullick et al. | 703/10 |
| 8,005,658 B2 * | 8/2011 | Tilke et al. | 703/10 |
| 2004/0153299 A1 | 8/2004 | Colvin et al. | |
| 2004/0220790 A1 * | 11/2004 | Cullick et al. | 703/10 |
| 2006/0151214 A1 * | 7/2006 | Prange et al. | 175/45 |
| 2008/0319726 A1 | 12/2008 | Berge et al. | |
| 2009/0076873 A1 * | 3/2009 | Johnson et al. | 705/8 |

OTHER PUBLICATIONS

Blaine R. Copenheaver, International Search Report—PCT/US2010/028782, dated Jun. 3, 2010, 2 pages, United States Patent and Trademark Office as International Search Authority, Alexandria, Virginia USA.
Blaine R. Copenheaver, Written Opinion—PCT/US2010/028782, dated Jun. 3, 2010, 5 pages, United States Patent and Trademark Office as International Search Authority, Alexandria, Virginia USA.
Article 34 Response—PCT/US2010/028782, dated Jan. 28, 2011, 7 pages, Houston, Texas USA.
Thomas Mansfield; International Preliminary Report on Patentability; PCT/US10/28782; dated Oct. 5, 2011; 9 pages; United States Patent and Trademark Office as International Search Authority, Alexandria, Virginia, USA.
Xiaoyan, Xu; Notice of First Office Action dated Sep. 23, 2013; Patent Application No. 201080015244.7; 9 pages; SIPO; Beijing, China.
Miip; Memo Concerning Fourth Official Action dated Aug. 15, 2014; Patent Application No. MX/a/2011/010268; 3 pages; Mexican Patent Office; Mexico.

(Continued)

*Primary Examiner* — Thomas L Mansfield
(74) *Attorney, Agent, or Firm* — Kilpatrick Townsend & Stockton LLP

(57) ABSTRACT

Systems and methods for determining the optimum number of platforms to be used in a hydrocarbon field development and their position. The systems and methods determine the least valuable platform(s) and eliminate them from use in the hydrocarbon field development.

18 Claims, 7 Drawing Sheets

(56) References Cited

OTHER PUBLICATIONS

Francisco Javier Uhthoff Orive; Response to Fourth Office Action dated Aug. 15. 2014; Oct. 27, 2014; Patent Application No. MX/a/2011/010268; 2 pages; Mexican Patent Office; Mexico.

Xiaoyan, Xu; Second Office Action dated Jun. 3, 2014; Patent Application No. 201080015244.7; 15 pages; SIPO; Beijing, China.

Zhang, Jing; Translation of Observation dated Aug. 3, 2014; Patent Application No. 201080015244.7; 3 pages; CN-Know How; Bejing, China.

John Brass; Response to Examiners Report Dated Nov. 3, 2014; Nov. 24, 2014; Australian Patent Application No. 2010232785; 5 pages; Spruson and Ferguson; Austrilia.

Xiaoyan, Xu; Notice of Third Office Action dated Nov. 25, 2014; Patent Application No. 201080015244.7; 12 pages; SIPO;; Beijing, China.

Ying-Ying Hou; Response to Third Office Action dated Nov. 25, 2014; Feb. 10, 2015; Patent Application No. 201080015244.7; 12 pages; Shanghai Patent & Trademark Law Office, LLC; China.

N.V. Zyatdinov; Office Action dated Aug. 6, 2014; Patent Application No. 201171196/(31); 2 pages; Eurasian Patent Office; Russia.

Yury Kuznnestov; Response to Office Action dated Aug. 6, 2014; May 29, 2015; 5 pages; Gorodissky; Russia.

Miip; Office Action dated Oct. 9, 2013; .Patent Application No. MX/a/2011/010268; 2 pages; Mexican Patent Office; Mexico.

Fernando Ahedo; Response to Office Action dated Oct. 9, 2013; Patent Application No. MX/a/2011/010268; Jan. 27, 2014; Uhtoff, Gomez, Vega & Uhtoff; Mexico.

Ying-Ying Hou; Response to First Office Action dated Sep. 23, 2013; Jan. 28, 2014; 8 pages; Patent Application No. 201080015244.7; CN-Know How; Beijing, China.

Andrey N. Bazhenov; Response to Office Action; dated Jan. 4, 2016; 6 pages; Patent Application No. 20171196; Gorodissky & Partners; Russia, N.V. Zyadinov; Office Action; dated Jan. 4, 2016; 2 pages; Patent Application No. 201171196; Gorodissky & Partners; Russia.

European Application No. 10759240.4, Extended European Search Report dated Apr. 11, 2017, 7 pages.

* cited by examiner

SYSTEMS AND METHODS FOR DETERMINING OPTIMUM PLATFORM COUNT AND POSITION

CROSS-REFERENCE TO RELATED APPLICATIONS

Not applicable.

STATEMENT REGARDING FEDERALLY SPONSORED RESEARCH

Not applicable.

FIELD OF THE INVENTION

The present invention generally relates to systems and methods for determining the optimum number of platforms, sometimes referred to as pads, in a hydrocarbon field development and their position. More particularly, the present invention relates to determining the least valuable platform(s) and eliminating them from use in the hydrocarbon field development.

BACKGROUND OF THE INVENTION

In the oil and gas industry, once a hydrocarbon field development has been fully planned and contains a set of platforms that will hit all or most (depending upon engineering and geographic constraints) of the drilling targets, it is often desirable to investigate how many fewer targets would be hit if less platforms were used in the development. A platform is said to hit a particular drilling target if a well is planned from that platform to the target. Each platform will have a drilling template or a slot template, which represents the number of locations from which to drill the wells. These locations, called slots, determine how many wells can be drilled from the platform. How far from a platform a target can be hit by the platform represents the reach. There is generally an absolute maximum for a particular hydrocarbon field development, but each target may also have a maximum effective reach due to its depth and the engineering constraints on the type of well planned for that type of target.

Consequently, there is a particular cost associated with each platform and, depending upon the environment, type and size of the platform, this cost could run from the tens of thousands to millions of dollars. Likewise, there is a particular value associated with each target hit by each platform within a particular development scenario. Development scenarios contain different configurations of platforms and targets, which contribute to an overall value for the scenario. When planning the hydrocarbon field development, there will often be a preferred number of targets. If a platform adds fewer than the preferred number of targets to the scenario, then the value of the scenario is greater without the platform.

The objective in hydrocarbon field development is then to identify the platform that will least impact the number of targets hit, remove the platform, re-plan the scenario without the platform, and proceed to the next least valuable platform until such point where removing the next least valuable platform would cause the scenario to drop below the preferred number of targets. In a relatively small field, with only a handful of platforms, this job can often be done visually. On the other hand, in a large field with tens to hundreds of platforms, it is both difficult and tedious to even look for possible candidates for removal, much less to do a thorough evaluation of them.

In U.S. Pat. No. 7,200,540, which is incorporated herein by reference, workflows are described for generating well path plans, and the resulting platform locations from selected well targets. The workflow described in the '540 patent begins with using any of three methods to arrive at the possible platform locations. The workflow then verifies that the platform location is in a geographically valid area. The actual platform locations are then determined by the "find best new location" algorithm and adjusted with the "optimize platform locations" algorithm. Either of these algorithms may use the "count reachable targets" algorithm, which determines the number of targets that may be reached and the total distance to reach the targets for a given set of platforms.

The techniques and workflows described in the '540 patent, however, fail to address identifying and removing the least valuable platform(s) in order to reduce development costs while keeping as many of the preferred number of targets that were previously hit by the removed platform(s) as possible. In other words, the conventional techniques and workflows merely determine the best locations for a fixed number of platforms.

There is therefore, a need for determining the optimum number of platforms to be used in a hydrocarbon field development and their position.

SUMMARY OF THE INVENTION

The present invention therefore, meets the above needs and overcomes one or more deficiencies in the prior art by providing systems and methods for determining the least valuable platform(s) and eliminating them from use in the hydrocarbon field development.

In one embodiment, the present invention includes a method for determining which platform in a project to remove, which comprises: i) calculating a first minimum value for each platform in the project on a computer system using a first-platform-value algorithm; ii) calculating a second minimum value for each platform in the project on the computer system using a second-platform-value algorithm; iii) compiling a list comprising each platform in the project with at least one of a lowest first minimum value and a lowest second minimum value; iv) calculating, on a computer system, how many targets each platform in the list hits on the computer system; and v) determining which platform in the project to remove based on how many targets each platform in the list hits.

In another embodiment, the present invention includes a program carrier device for carrying computer executable instructions for determining which platform in a project to remove. The instructions are executable to implement: i) calculating a first minimum value for each platform in the project on a computer system using a first-platform-value algorithm; ii) calculating a second minimum value for each platform in the project on the computer system using a second-platform-value algorithm; iii) compiling a list comprising each platform in the project with at least one of a lowest first minimum value and a lowest second minimum value; iv) calculating, on the computer system, how many targets each platform in the list hits; and v) determining which platform in the project to remove based on how many targets each platform in the list hits.

Additional aspects, advantages and embodiments of the invention will become apparent to those skilled in the art from the following description of the various embodiments and related drawings.

BRIEF DESCRIPTION OF THE DRAWINGS

The present invention is described below with references to the accompanying drawings in which like elements are referenced with like reference numerals, and in which.

DETAILED DESCRIPTION OF THE PREFERRED EMBODIMENTS

The subject matter of the present invention is described with specificity, however, the description itself is not intended to limit the scope of the invention. The subject matter thus, might also be embodied in other ways, to include different steps or combinations of steps similar to the ones described herein, in conjunction with other present or future technologies. Moreover, although the term "step" may be used herein to describe different elements of methods employed, the term should not be interpreted as implying any particular order among or between various steps herein disclosed unless otherwise expressly limited by the description to a particular order.

System Description

The present invention may be implemented through a computer-executable program of instructions, such as program modules, generally referred to as software applications or application programs executed by a computer. The software may include, for example, routines, programs, objects, components, and data structures that perform particular tasks or implement particular abstract data types. The software forms an interface to allow a computer to react according to a source of input. DecisionSpace® Well Planning, which is a commercial software application marketed by Landmark Graphics Corporation, may be used as an interface application to implement the present invention. The software may also cooperate with other code segments to initiate a variety of tasks in response to data received in conjunction with the source of the received data. The software may be stored and/or carried on any variety of memory media such as CD-ROM, magnetic disk, bubble memory and semiconductor memory (e.g., various types of RAM or ROM). Furthermore, the software and its results may be transmitted over a variety of carrier media such as optical fiber, metallic wire, free space and/or through any of a variety of networks such as the Internet.

Moreover, those skilled in the art will appreciate that the invention may be practiced with a variety of computer-system configurations, including hand-held devices, multi-processor systems, microprocessor-based or programmable-consumer electronics, minicomputers, mainframe computers, and the like. Any number of computer-systems and computer networks are acceptable for use with the present invention. The invention may be practiced in distributed-computing environments where tasks are performed by remote-processing devices that are linked through a communications network. In a distributed-computing environment, program modules may be located in both local and remote computer-storage media including memory storage devices. The present invention may therefore, be implemented in connection with various hardware, software or a combination thereof, in a computer system or other processing system.

Figure 1:
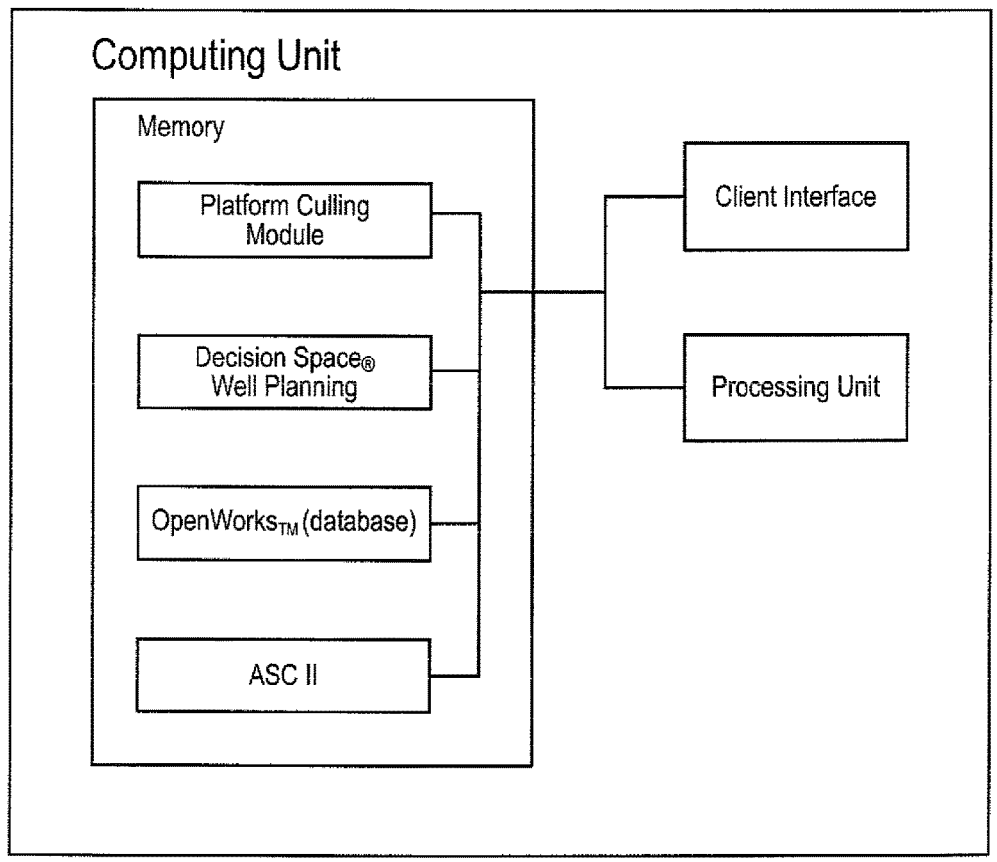
FIG. 1 is a block diagram illustrating one embodiment of a system for implementing the present invention.

Referring now to FIG. 1, a block diagram illustrates one embodiment of a system for implementing the present invention on a computer. The system includes a computing unit, sometimes referred to a computing system, which contains memory, application programs, a database, ASCII files, a client interface, and a processing unit. The computing unit is only one example of a suitable computing environment and is not intended to suggest any limitation as to the scope of use or functionality of the invention.

The memory primarily stores the application programs, which may also be described as program modules containing computer-executable instructions, executed by the computing unit for implementing the methods described herein and illustrated in FIGS. 2-8. The memory therefore, includes a Platform Culling Module, which may be used to interface with DecisionSpace® Well Planning for determining the least valuable platform(s) and eliminating them from use in the hydrocarbon field development. The memory also includes OpenWorks™, which is another software application marketed by Landmark Graphics Corporation and may be used as a database to supply data and/or store data results. ASCII files may also be used to supply data and/or store the data results.

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to, and/or presently being operated on by, the processing unit. By way of example, and not limitation, the computing unit includes an operating system, application programs, other program modules, and program data.

The components shown in the memory may also be included in other removable/nonremovable, volatile/non-volatile computer storage media. For example only, a hard disk drive may read from or write to nonremovable, non-volatile magnetic media, a magnetic disk drive may read from or write to a removable, non-volatile magnetic disk, and an optical disk drive may read from or write to a removable, nonvolatile optical disk such as a CD ROM or other optical media. Other removable/non-removable, volatile/non-volatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above therefore, store and/or carry computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like.

These and other input devices are often connected to the processing unit through the client interface that is coupled to a system bus, but may be connected by other interface and bus structures, such as a parallel port or a universal serial bus (USB). A monitor or other type of display device may be connected to the system bus via an interface, such as a video interface. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well known.

Method Description

Figure 2:
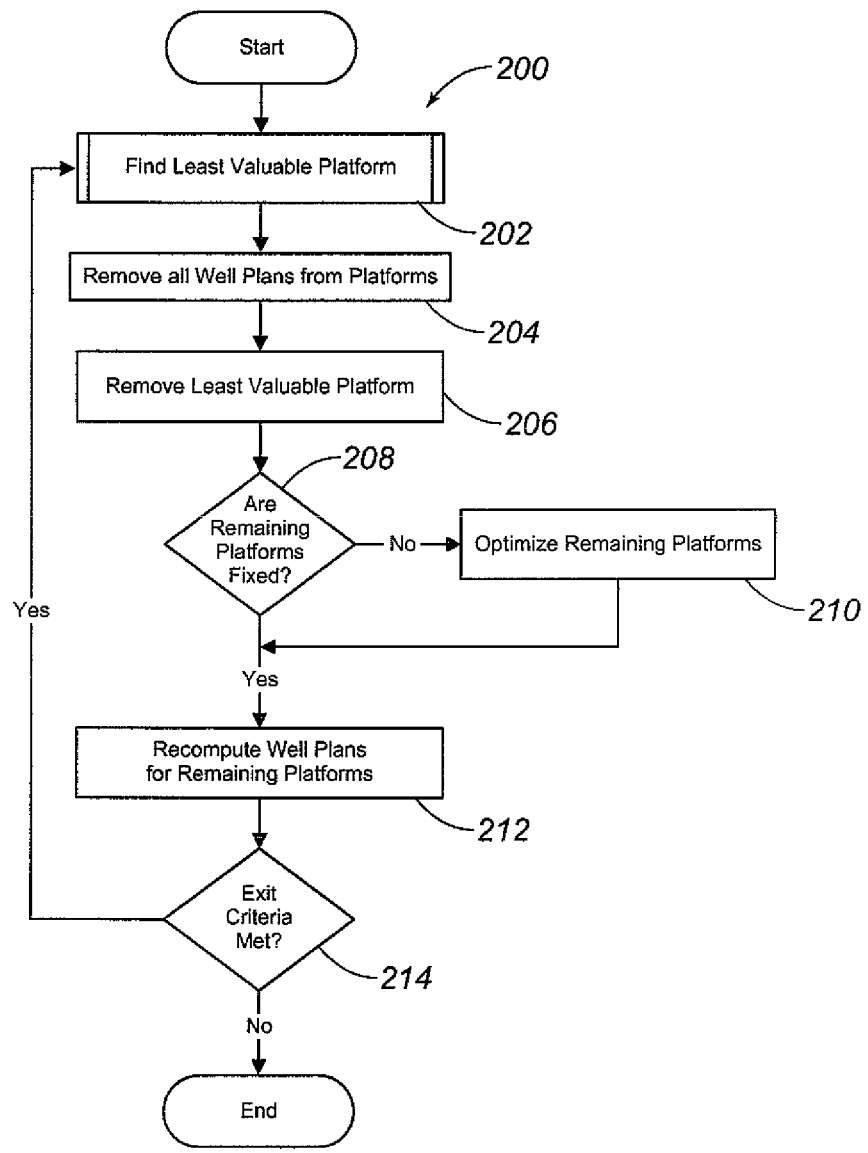
FIG. 2 is a flow diagram illustrating one embodiment of a method for implementing the present invention.

Referring now to FIG. 2, a flow diagram illustrates one embodiment of a method 200 for implementing the present invention.

Figure 3:
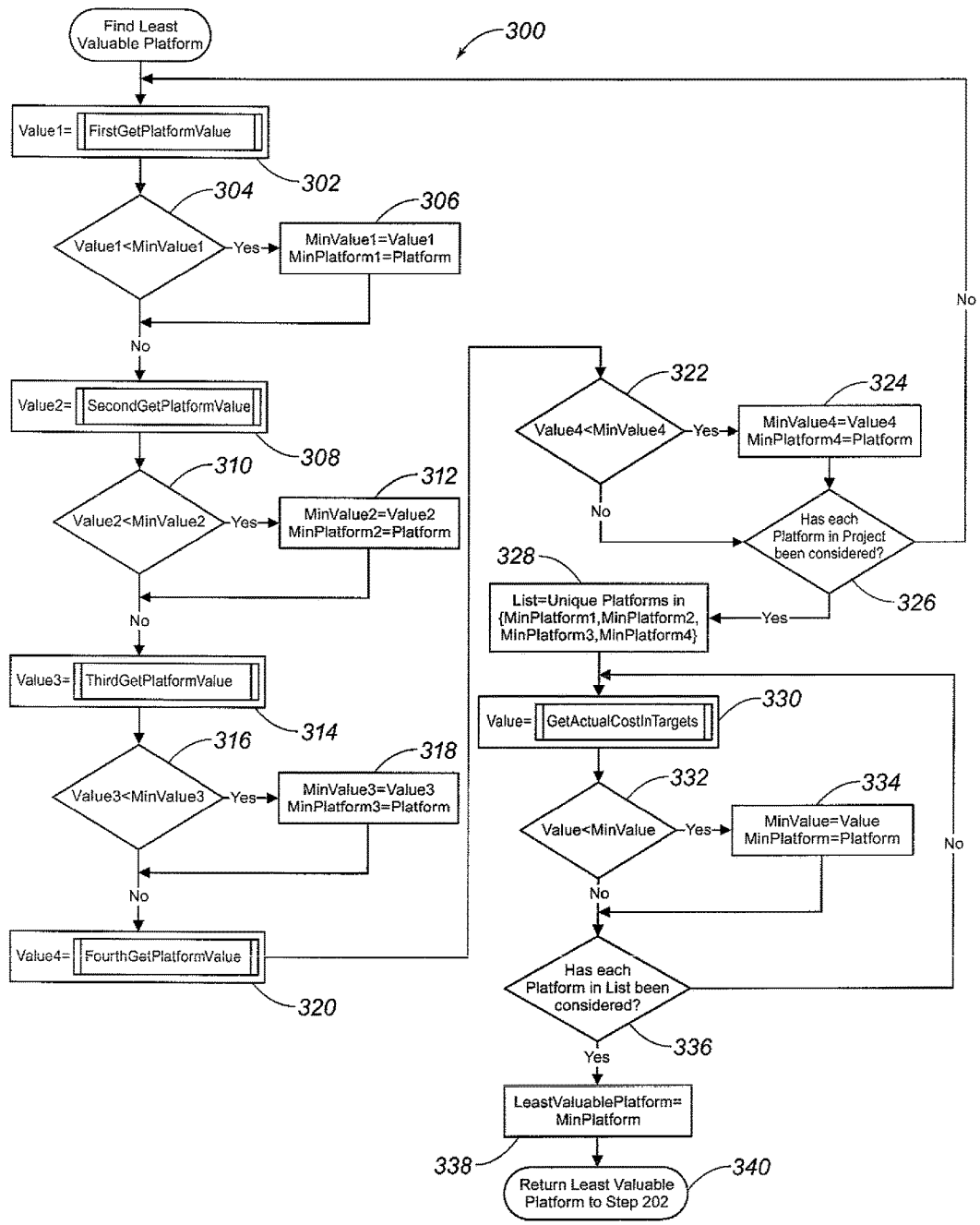
FIG. 3 is a flow diagram further illustrating step 202 in FIG. 2.

In step 202, the Find Least Valuable Platform algorithm is executed, which determines the least valuable platform according to the method 300 illustrated in FIG. 3.

In step 204, all well plans are removed from the platforms surrounding, and including, the least valuable platform that is determined in step 202.

In step 206, the least valuable platform determined in step 202 is removed from the project. According to the description of FIGS. 2-8, the project refers to platforms being considered for an exemplary hydrocarbon development. The project, however, may refer to different platforms being considered for other types of development.

In step 208, the method 200 determines if the remaining platforms are fixed. If the platform locations are fixed, then the method 200 continues to step 212. If the platform locations are not fixed, then the method 200 continues to step 210.

In step 210, the remaining platforms are optimized using techniques well known in the art to determine new, optimal, locations for the remaining platforms. In one embodiment, the Optimize Platform Locations algorithm described in the '540 patent may be used to compute the optimal location for each platform—given the set of targets, the intended plan types, and the local geography. This algorithm also returns the number of targets that can be hit from the optimum configuration of the remaining platforms. Alternatively, the optimal location for each platform may be computed using the same algorithm described in reference to step 820 (FIG. 8) and stored as part of the results of step 202 before being used in step 212.

In step 212, the well plans for the remaining platforms are re-computed using techniques well known in the art for hitting the targets.

In step 214, the method 200 determines if the exit criteria have been met. If the exit criteria have been met, then the method 200 ends. If the exit criteria have not been met, then the method 200 returns to step 202 to determine another least valuable platform and repeat the remaining steps of the method 200. There are several different exit criteria that may be used to end the method 200. In one embodiment, for example, the exit criteria may allow the user to decide when it is no longer cost-effective to remove platforms. When removing the least valuable platform costs more targets than the user is willing to sacrifice, the user can undo changes and go back to a previous state. In another embodiment, the exit criteria may allow the user to repeat the method 200 a predetermined number of times before exiting. A list of scenarios is returned, which is based on the removal of different platforms. The user may then select the most cost-effective scenario. In yet another embodiment, for example, the exit criteria may allow the user to specify a maximum number of targets that can be eliminated in order to save a platform or two. The least valuable platform(s) may then be removed from the scenario until removing one more platform would cost more than the maximum targets that were eliminated. Other exit criteria may be used, depending on when the user prefers to end the method 200.

Referring now to FIG. 3, the method 300 generally illustrates one embodiment of the Find Least Valuable Platform algorithm for step 202 in FIG. 2. There are a number of ways to evaluate platforms to determine which one is the least valuable. The simplest way is to count the number of targets that are hit by that platform. A platform, for example, with nine targets hit, that is either far from other platforms or is surrounded by platforms with all of their slots used might be more valuable than a platform with twelve targets hit that is surrounded by platforms with excess slot capacity. However, drilling hazards or geographic constraints might render those surrounding platforms useless in trying to compensate for removing the twelve-target platform. In that case, it may be that the nine-target platform is the better candidate for removal. Likewise, there are many ways in which the number of targets hit, the quantity of nearby excess slot capacity and the distance to that slot capacity can be weighted in trying to determine an optimal measurement of platform value. Consequently, there really is not one optimal measurement of platform value, but a number of measurements that could be predictors of platform value. To circumvent the problem of not knowing which predictor will yield the best (least valuable) platform to be removed, the method 300 analyzes several predictors for each platform in the project and evaluates the resulting least valuable platform candidates to determine the best (least valuable) platform.

Figure 4:
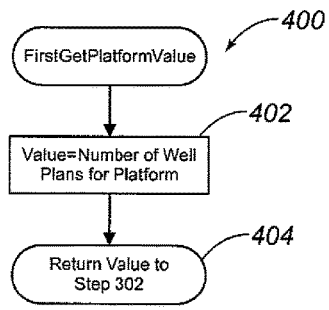
FIG. 4 is a flow diagram further illustrating step 302 in FIG. 3.

In step 302, Value1 is set equal to the results from the FirstGetPlatformValue algorithm, which is executed using an input platform in the project according to the method 400 illustrated in FIG. 4. The input platform is the one currently being considered by step 302. During the first iteration of step 302, any platform in the project may be used as the input platform.

In step 304, the method 300 determines if Value1 is less than MinValue1. If Value1 is less than MinValue1, then the method 300 continues to step 306. If Value1 is not less than MinValue1, then the method 300 continues to step 308. MinValue1 is a predetermined value, which is always greater than Value1 during the first iteration of step 302 in order for the method 300 to continue to step 306.

In step 306, MinValue1 is set equal to Value1 and MiniPlatform1 is set equal to Platform, which is the input platform.

Figure 5:
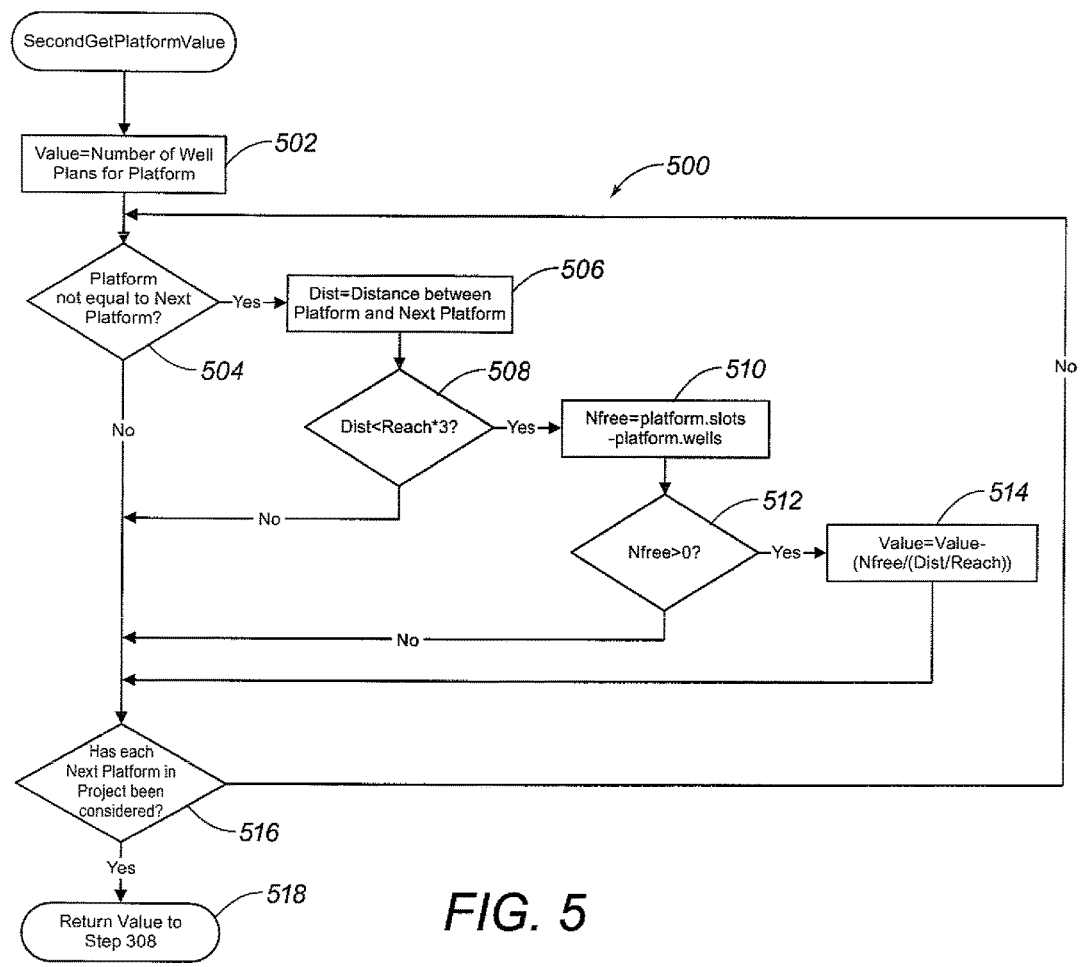
FIG. 5 is a flow diagram her illustrating step 308 in FIG. 3.

In step 308, Value2 is set equal to the results from the SecondGetPlatformValue algorithm, which is executed using the input platform according to the method 500 illustrated in FIG. 5.

In step 310, the method 300 determines if Value2 is less than MinValue2. If Value2 is less than MinValue2, then the method 300 continues to step 312. If Value2 is not less than MinValue2, then the method 300 continues to step 314. MinValue2 is a predetermined value, which is always greater than Value2 during the first iteration of step 310 in order for the method 300 to continue to step 312.

In step 312, MinValue2 is set equal to Value2 and MinPlatform2 is set equal to Platform, which is the input platform.

Figure 6:
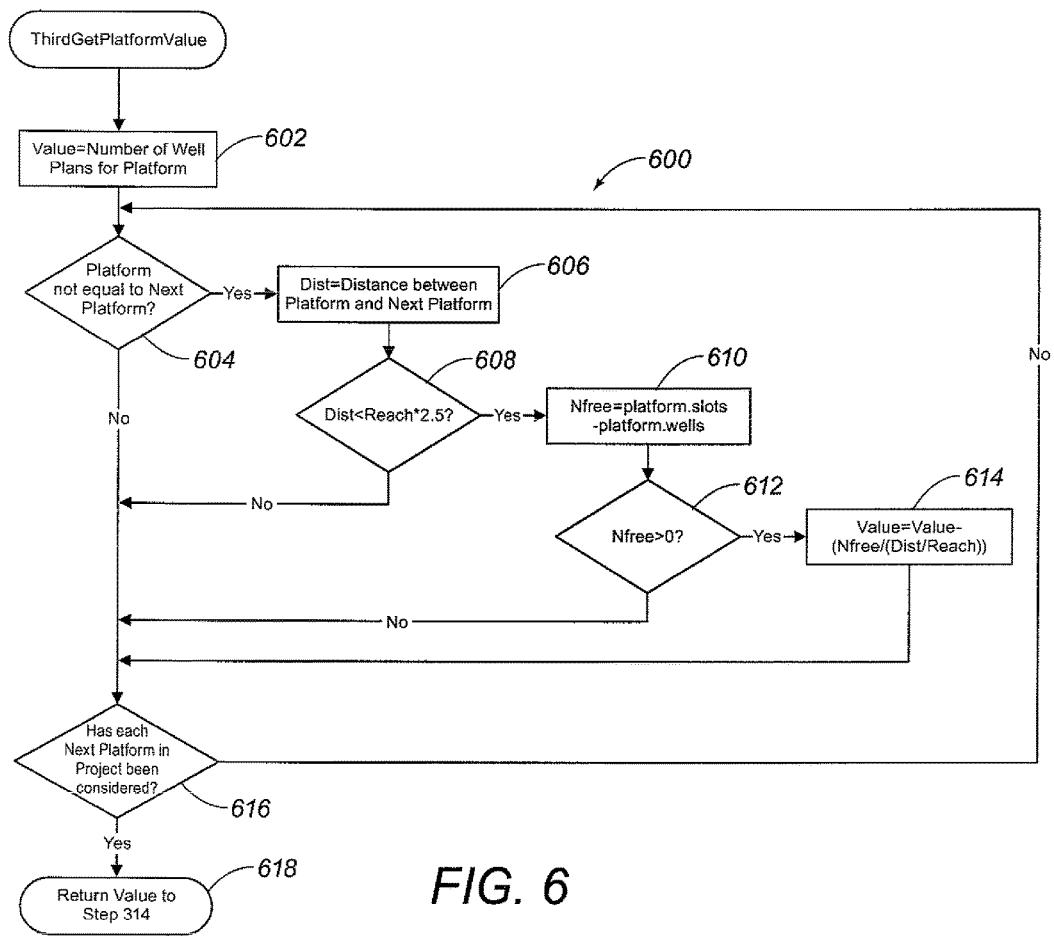
FIG. 6 is a flow diagram further illustrating step 314 in FIG. 3.

In step 314, Value3 is set equal to the results from the ThirdGetPlatformValue algorithm, which is executed using the input platform according to the method 600 illustrated in FIG. 6.

In step 316, the method 300 determines if Value3 is less than MinValue3. If Value3 is less than MinValue3, then the method 300 continues to step 318. If Value3 is not less than MinValue3, then the method 300 continues to step 320. MinValue3 is a predetermined value, which is always greater than Value3 during the first iteration of step 316 in order for the method 300 to continue to step 318.

In step 318, MinValue3 is set equal to Value3 and MinPlatform3 is set equal to Platform, which is the input platform.

Figure 7:
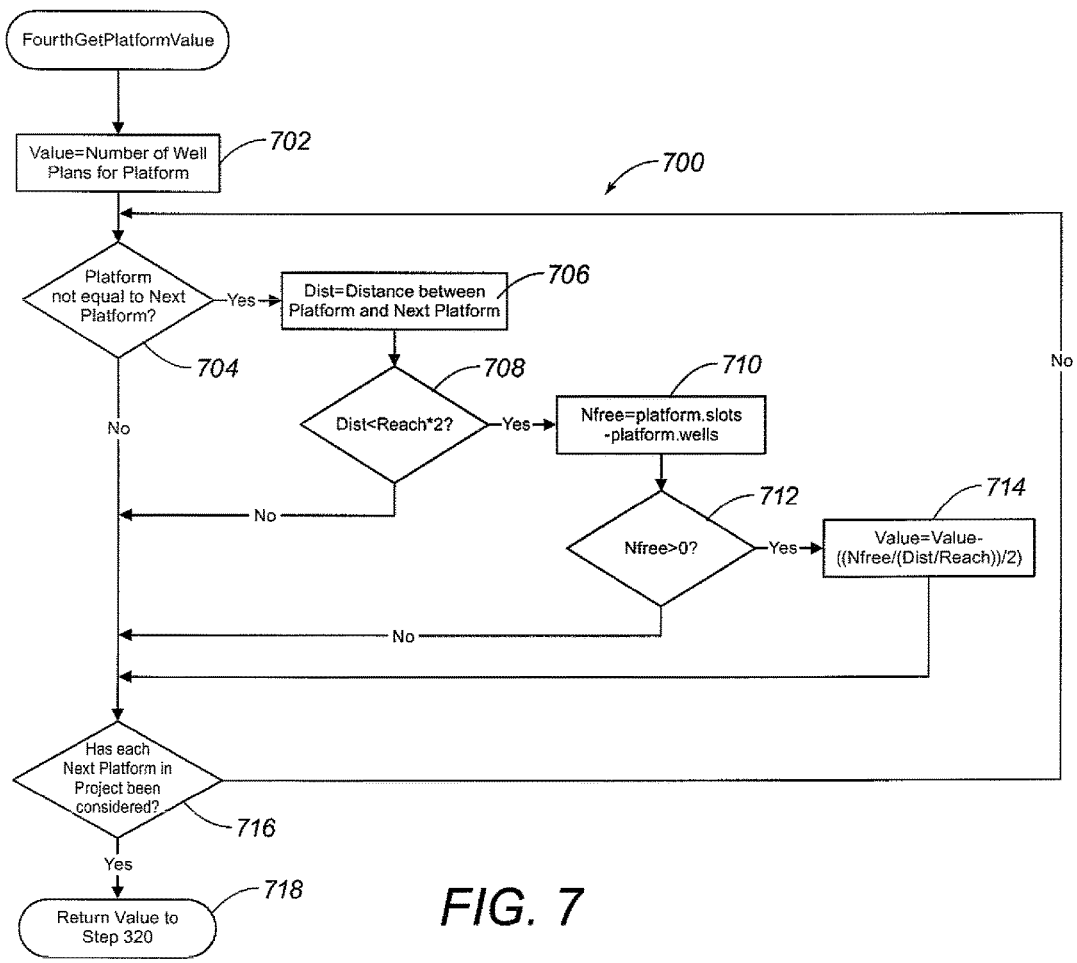
FIG. 7 is a flow diagram further illustrating step 320 in FIG. 3.

In step 320, Value4 is set equal to the results from the FourthGetPlatformValue algorithm, which is executed using the input platform according to the method 700 illustrated in FIG. 7.

In step 322, the method 300 determines if Value4 is less than MinValue4. If Value4 is less than MinValue4, then the method 300 continues to step 324. If Value4 is not less than MinValue4, then the method 300 continues to step 326. MinValue4 is a predetermined value, which is always greater than Value4 during the first iteration of step 322 in order for the method 300 to continue to step 324.

In step 324, MinValue4 is set equal to Value4 and MinPlatform4 is set equal to Platform, which is the input platform.

In step 326, the method 300 determines if each platform in the project has been considered. If each platform in the project has been considered, then the method 300 continues to step 328. If each platform in the project has not been considered, then the method 300 returns to step 302 and repeats using another input platform in the project. Steps 302-326 are therefore, repeated until all platforms in the project have been considered (processed) according to these steps.

In step 328, a list of least valuable platform candidates is created, which includes the unique platforms in MinPlatform1, MinPlatform2, MinPlatform3, and MinPlatform4. At this step, MinPlatform1, MinPlatform2, MinPlatform3 and MinPlatform4 represent one or more platforms in the project with the lowest value for MinValue1, MinValue2, MinValue3 and MinValue4, respectively. If the same platform, for example, scored the lowest value for MinValue1, MinValue2, MinValue3 and MinValue4, then there would only be one platform represented by MinPlatform1, MinPlatform2, MinPlatform3 and MinPlatform4. As a result, there could only be one unique platform in the list.

Figure 8:
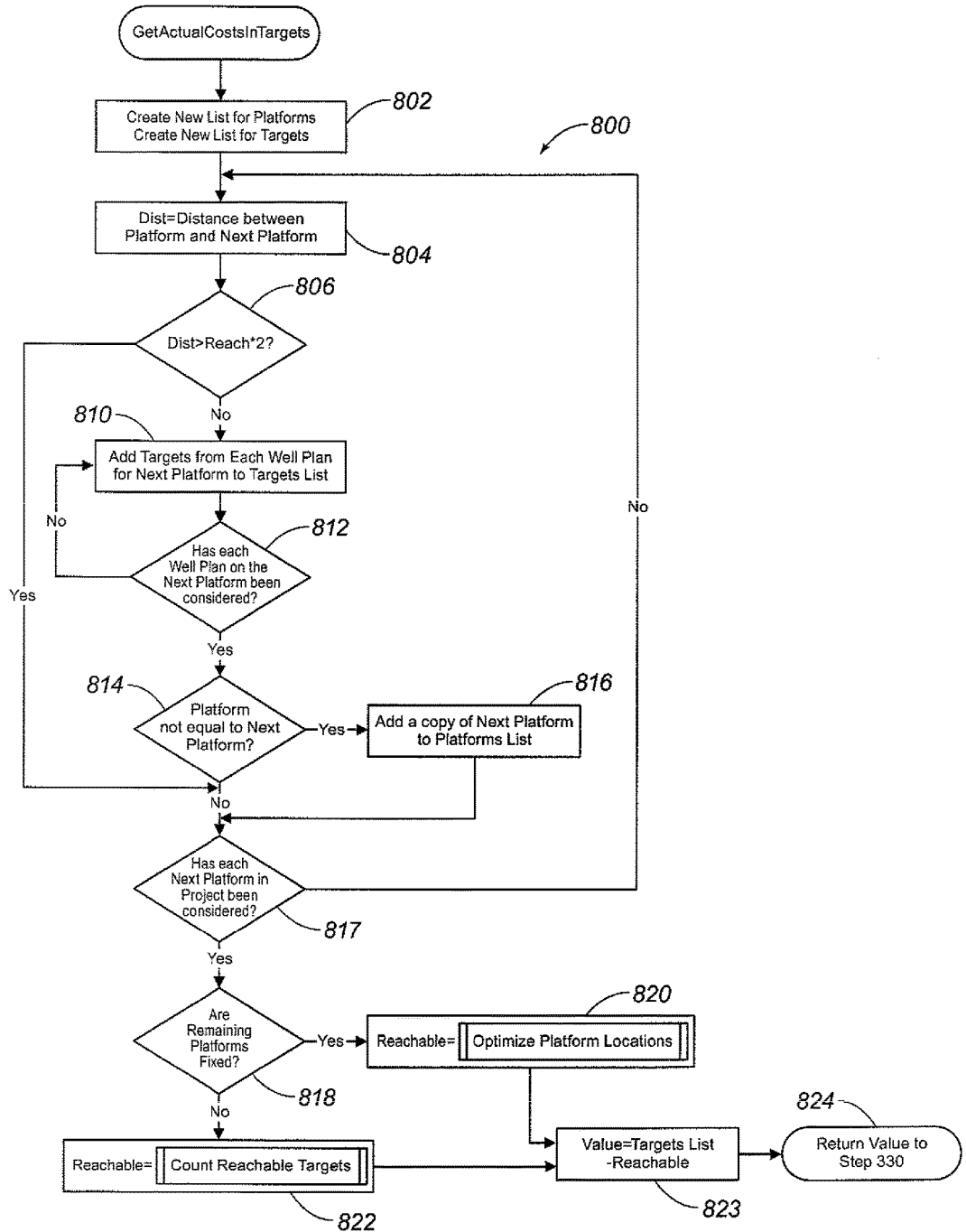
FIG. 8 is a flow diagram further illustrating step 330 in FIG. 3.

In step 330, Value is set equal to the results from the GetActualCostInTargets algorithm, which is executed using a unique platform in the list according to the method 800 illustrated in FIG. 8. This algorithm determines which of the least valuable platform candidates in the list from step 328 is the best platform to remove. During the first iteration of step 330, any unique platform in the list from step 328 may be used.

In step 332, the method 300 determines if Value is less than MinValue. If Value is less than MinValue, then the method 300 continues to step 336. If Value is not less than MinValue, then the method 300 continues to step 334. MinValue is a predetermined value, which is always greater than Value during the first iteration of step 332 in order for the method 300 to continue to step 334.

In step 334, MinValue is set equal to Value and MinPlatform is set equal to Platform, which is the unique platform from step 330.

In step 336, the method 300 determines if each unique platform in the list from step 328 has been considered. If each platform in the list has been considered, then the method 300 continues to step 338. If each platform in the list has not been considered, then the method 300 returns to step 330 and repeats using another unique platform in the list from step 328. Steps 330-336 are therefore, repeated until all unique platforms in the list from step 328 have been considered (processed) according to these steps. The candidate whose removal would result in the fewest lost targets is considered the least valuable and will be the one removed—i.e. as having the lowest value for MinValue.

In step 338, Least Valuable Platform is set equal to MinPlatform, which represents the least valuable platform in the project.

In step 340, Least Valuable Platform is returned to step 202.

Referring now to FIG. 4, the method 400 generally illustrates one embodiment of the FirstGetPlatformValue algorithm for step 302 in FIG. 3.

In step 402, Value is set equal to the number of well plans for Platform, which is the input platform used in step 302.

In step 404, Value is returned to step 302 in FIG. 3.

Referring now to FIG. 5, the method 500 generally illustrates one embodiment of the SecondGetPlatformValue algorithm for step 308 in FIG. 3.

In step 502, Value is set equal to the number of well plans for Platform, which is the input platform used in step 308.

In step 504, the method 500 determines if Platform is not equal to NextPlatform. If Platform is not equal to NextPlatform, then the method 500 continues to step 506. If Platform is equal to NextPlatform, then the method 500 continues to step 516. NextPlatform is another platform in the project.

In step 506, Dist is set equal to the distance between Platform and NextPlatform.

In step 508, the method 500 determines if Dist is less than Reach multiplied by 3. If Dist is less than Reach multiplied by 3, then the method 500 continues to step 510. If Dist is not less than Reach multiplied by 3, then the method 500 continues to step 516. Reach represents the maximum reach or maximum effective reach for Platform.

In step 510, Nfree is set equal to platform.slots minus platform.wells. Nfree represents the number of free slots, which is computed as the total number of slots Platform is designed to have (platform.slots) minus the number of wells currently planned from Platform (platform.wells). Each well is assumed to occupy only one slot.

In step 512, the method 500 determines if Nfree is greater than 0. If Nfree is greater than 0, then the method 500 continues to step 514. If Nfree is not greater than 0, then the method 500 continues to step 516.

In step 514, Value is set equal to Value minus Nfree divided by Dist divided by Reach. During the first iteration of step 514, Value from step 502 is used. During all other reiterations of step 514, Value from the prior iteration of step 514 is used.

In step 516, the method 500 determines if each nextplatform in the project has been considered. If each nextplatform in the project has been considered, then the method 500 continues to step 518. If each nextplatform in the project has not been considered, then the method 500 returns to step 504.

In step 518, Value is returned to step 308 in FIG. 3.

Referring now to FIG. 6, the method 600 generally illustrates one embodiment of the ThirdGetPlatformValue algorithm for step 314 in FIG. 3.

In step 602, Value is set equal to the number of well plans for Platform, which is the input platform used in step 314.

In step 604, the method 600 determines if Platform is not equal to NextPlatform. If Platform is not equal to NextPlatform, then the method 600 continues to step 606. If Platform is equal to NextPlatform, then the method 600 continues to step 616. NextPlatform is another platform in the project.

In step 606, Dist is set equal to the distance between Platform and NextPlatform.

In step 608, the method 600 determines if Dist is less than Reach multiplied by 2.5. If Dist is less than Reach multiplied by 2.5, then the method 600 continues to step 610. If Dist is not less than Reach multiplied by 2.5, then the method 600 continues to step 616. Reach represents the maximum reach or maximum effective reach for Platform.

In step 610, Nfree is set equal to platform.slots minus platform.wells. Nfree represents the number of free slots, which is computed as the total number of slots Platform is designed to have (platform.slots) minus the number of wells currently planned from Platform (platform.wells). Each well is assumed to occupy only one slot.

In step 612, the method 600 determines if Nfree is greater than 0. If Nfree is greater than 0, then the method 600 continues to step 614. If Nfree is not greater than 0, then the method 600 continues to step 616.

In step 614, Value is set equal to Value minus Nfree divided by Dist divided by Reach. During the first iteration of step 614, Value from step 602 is used. During all other reiterations of step 614, Value from the prior iteration of step 614 is used.

In step 616, the method 600 determines if each nextplatform in the project has been considered. If each nextplatform in the project has been considered, then the method 600 continues to step 618. If each nextplatform in the project has not been considered, then the method 600 returns to step 604.

In step 618, Value is returned to step 314 in FIG. 3.

Referring now to FIG. 7, the method 700 generally illustrates one embodiment of the FourthGetPlatformValue algorithm for step 320 in FIG. 3.

In step 702, Value is set equal to the number of well plans for Platform, which is the input platform used in step 320.

In step 704, the method 700 determines if Platform is not equal to NextPlatform. If Platform is not equal to NextPlatform, then the method 700 continues to step 706. If Platform is equal to NextPlatform, then the method 700 continues to step 716. NextPlatform is another platform in the project.

In step 706, Dist is set equal to the distance between Platform and NextPlatform.

In step 708, the method 700 determines if Dist is less than Reach multiplied by 2. If Dist is less than Reach multiplied by 2, then the method 700 continues to step 710. If Dist is not less than Reach multiplied by 2, then the method 700 continues to step 716. Reach represents the maximum reach or maximum effective reach for Platform.

In step 710, Nfree is set equal to platform.slots minus platform.wells. Nfree represents the number of free slots, which is computed as the total number of slots Platform is designed to have (platform.slots) minus the number of wells currently planned from Platform (platform.wells). Each well is assumed to occupy only one slot.

In step 712, the method 700 determines if Nfree is greater than 0. If Nfree is greater than 0, then the method 700 continues to step 714. If Nfree is not greater than 0, then the method 700 continues to step 716.

In step 714, Value is set equal to Value minus Nfree divided by Dist divided by reach divided by 2. During the first iteration of step 714, Value from step 702 is used. During all other reiterations of step 714, Value from the prior iteration of step 714 is used.

In step 716, the method 700 determines if each nextplatform in the project has been considered. If each nextplatform in the project has been considered, then the method 700 continues to step 718. If each nextplatform in the project has not been considered, then the method 700 returns to step 704.

In step 718, Value is returned to step 320 in FIG. 3.

Referring now to FIG. 8, the method 800 generally illustrates one embodiment of the GetActualCostInTargets algorithm for step 330 in FIG. 3.

In step 802, a new list is created for platforms and a new list is created for targets.

In step 804, Dist is set equal to the distance between Platform and NextPlatform. Platform is the unique platform used in step 330. NextPlatform is another platform in the project.

In step 806, method 800 determines if Dist is greater than Reach multiplied by 2. If Dist is greater than Reach multiplied by 2, then the method 800 continues to step 808. If Dist is not greater than Reach multiplied by 2, then the method 800 continues to step 810. Reach represents the maximum reach or maximum effective reach for Platform.

In step 810, targets from each well plan for NextPlatform are added to the targets list created in step 802.

In step 812, the method 800 determines if each well plan for NextPlatform has been considered. If each well plan for NextPlatform has been considered, then the method 800 continues to step 814. If each well plan for NextPlatform has not been considered, then the method 800 returns to step 810.

In step 814, the method 800 determines if Platform is not equal to NextPlatform. If Platform is not equal to NextPlatform, then the method 800 continues to step 816. If Platform is equal to NextPlatform, then the method 800 continues to step 817.

In step 816, a copy of NextPlatform is added to the platforms list created in step 802.

In step 817, the method 800 determines if each nextplatform in the project has been considered. If each nextplatform in the project has been considered, then the method 800 continues to step 818. If each nextplatform in the project has not been considered, then the method 800 returns to step 804.

In step 818, the method 800 determines if the remaining platforms are fixed. If the platform locations are fixed, then the method 800 continues to step 820. If the platform locations are not fixed, then the method 800 continues to step 822.

In step 820, Reachable is set equal to the results of the Optimize Platform Locations algorithm described in the '540 patent.

In step 822, Reachable is set equal to the Count Reachable Targets algorithm described in the '540 patent. This algorithm returns the number of targets that can be hit from the remaining platforms.

In step 823, Value is set equal to targets.size( ) minus Reachable. In other words, Reachable is the number of targets that can be hit from the remaining platforms according to their position (step 820 or 822), which is subtracted from Targets List. Targets List represents the number of targets currently being hit by each respective platform in the list generated by step 328 and the surrounding platforms. Thus, Value in step 823 represents the number of targets that would be lost by removing the respective platform from the scenario.

In step 824, Value is returned to step 330 in FIG. 3.

While the present invention has been described in connection with presently preferred embodiments, it will be understood by those skilled in the art that it is not intended to limit the invention to those embodiments. Although the illustrated embodiments of the present invention relate to determining optimum platform count and position for the oil and gas industry, the present invention may also be applied to any drilling application and in other fields and disciplines. For example, the systems and methods described herein may be particularly useful for determining the optimum number of platforms or pads to be used in positioning cell phone towers, electrical lines, homes and the like. It is therefore, contemplated that various alternative embodiments and modifications may be made to the disclosed embodiments without departing from the spirit and scope of the invention defined by the appended claims and equivalents thereof.

The invention claimed is:

1. A computer-implemented method, comprising:
    identifying, by a computer system including a processor, a project associated with a hydrocarbon field development, the hydrocarbon field development including a plurality of platforms used to produce hydrocarbon fluid, each platform of the plurality of platforms being associated with a slot representing a physical location of the platform, the project corresponding to a data structure storing data representing the plurality of platforms and the corresponding physical locations, and each platform of the plurality of platforms connecting to one or more targets of the hydrocarbon field development;
    accessing, by the processor, a plurality of predictors that identify candidate platforms for removal from the plurality of platforms corresponding to the project;
    executing, by the processor, the plurality of predictors, the execution including:
        calculating, by the processor, a first minimum value for each platform of the plurality of platforms, the first minimum value for each platform being calculated by executing a first-platform-value algorithm; and
        calculating, by the processor, a second minimum value for each platform of the plurality of platforms, the second minimum value for each platform being calculated by executing a second-platform-value algorithm;
    evaluating, by the processor, at least one result from the execution of the plurality of predictors, the result of the execution including generating a list comprising one or more candidate platforms from the plurality of platforms, each of the one or more candidate platforms included in the list having a lowest first minimum value of the calculated first minimum values and a lowest second minimum value of the calculated second minimum values;
    calculating, by the processor, a number of targets each platform in the list connects to;
    determining, by the processor, a platform in the list to remove from the project based the calculated number of targets for each platform;
    in response to removing the platform from the project, eliminating the removed platform from being used to produce hydrocarbon fluid in the hydrocarbon field development, and the slot representing the physical location of the removed platform being unused;
    determining, after the platform is eliminated from use in the hydrocarbon field development, that one or more remaining platforms of the plurality of platforms are not in fixed positions;
    executing, by the processor, a workflow for iteratively determining a new location for each remaining platform of the one or more remaining platforms that are not in a fixed position, the execution of the workflow resulting in moving at least one remaining platform to the corresponding new location;
    reconfiguring, by the processor, the project by modifying the data stored in the data structure to remove the platform from the project and include the new location of the one or more remaining platforms; and
    repeatedly executing the plurality of predictors for the remaining platforms of the plurality of platforms, the repeated execution resulting in identification of one or more additional platforms to eliminate from use in the hydrocarbon field development, and the repeated execution ending upon satisfying an exit criteria.

2. The method of claim 1, wherein the first minimum value is based on how many well plans there are for each platform.

3. The method of claim 1, wherein the second minimum value is based on how many well plans there are for each platform, a reach for each platform and a first multiplier.

4. The method of claim 1, further comprising:
    calculating a third minimum value for each platform in the project using a third-platform-value algorithm; and
    recompiling the list comprising each platform in the project with at least one of the lowest first minimum value, the lowest second minimum value and a lowest third minimum value.

5. The method of claim 4, further comprising:
    evaluating a fourth minimum value for each platform in the project using a fourth-platform-value algorithm; and
    recompiling the list comprising each platform in the project with at least one of the lowest first minimum value, the lowest second minimum value, the lowest third minimum value and a lowest fourth minimum value.

6. The method of claim 4, wherein the third minimum value is based on how many well plans there are for each platform, a reach for each platform and a second multiplier.

7. The method of claim 5, wherein the fourth minimum value is based on how many well plans there are for each platform, a reach for each platform and a third multiplier.

8. The method of claim 1, wherein the list comprises one or two platforms in the project.

9. The method of claim 1, further comprising:
receiving, by the computer system, input corresponding to a selection of a platform in the project to remove that is in the list and connects to a least number of targets.

10. A program carrier device for carrying computer executable instructions, the instructions being executable to implement:
identifying a project associated with a hydrocarbon field development, the hydrocarbon field development including a plurality of platforms used to produce hydrocarbon fluid, each platform of the plurality of platforms being associated with a slot representing a physical location of the platform, the project corresponding to a data structure storing data representing the plurality of platforms and the corresponding physical locations, and each platform of the plurality of platforms connecting to one or more targets of the hydrocarbon field development;
accessing a plurality of predictors that identify candidate platforms for removal from the plurality of platforms corresponding to the project;
executing the plurality of predictors, the execution including:
calculating a first minimum value for each platform of the plurality of platforms, the first minimum value for each platform being calculated by executing a first-platform-value algorithm; and
calculating a second minimum value for each platform of the plurality of platforms, the second minimum value for each platform being calculated by executing a second-platform-value algorithm;
evaluating at least one result from the execution of the plurality of predictors, the result of the execution including generating a list comprising one or more candidate platforms from the plurality of platforms, each of the one or more candidate platforms included in the list having a lowest first minimum value of the calculated first minimum values and a lowest second minimum value of the calculated second minimum values;
calculating, a number of targets each platform in the list connects to;
determining which platform in the project to remove from the project based on calculated number of targets for each platform;
in response to removing the platform from the project, eliminating the removed platform from being used to produce hydrocarbon fluid in the hydrocarbon field development, and the slot representing the physical location of the removed platform being unused;
determining, after the platform is eliminated from use in the hydrocarbon field development, that one or more remaining platforms of the plurality of platforms are not in fixed positions;
executing a workflow for iteratively determining a new location for each remaining platform of the one or more remaining platforms that are not in a fixed position, the execution of the workflow resulting in moving at least one remaining platform to the corresponding new location;
reconfiguring, by a processor, the project by modifying the data stored in the data structure to remove the platform from the project and include the new location of the one or more remaining platforms; and
repeatedly executing the plurality of predictors for the remaining platforms of the plurality of platforms, the repeated execution resulting in identification of one or more additional platforms to eliminate from use in the hydrocarbon field development, and the repeated execution ending upon satisfying an exit criteria.

11. The program carrier device of claim 10, wherein the first minimum value is based on how many well plans there are for each platform.

12. The program carrier device of claim 10, wherein the second minimum value is based on how many well plans there are for each platform, a reach for each platform and a first multiplier.

13. The program carrier device of claim 10, further comprising:
calculating a third minimum value for each platform in the project using a third-platform-value algorithm; and
recompiling the list comprising each platform in the project with at least one of the lowest first minimum value, the lowest second minimum value and a lowest third minimum value.

14. The program carrier device of claim 13, further comprising:
evaluating a fourth minimum value for each platform in the project using a fourth-platform-value algorithm; and
recompiling the list comprising each platform in the project with at least one of the lowest first minimum value, the lowest second minimum value, the lowest third minimum value and a lowest fourth minimum value.

15. The program carrier device of claim 13, wherein the third minimum value is based on how many well plans there are for each platform, a reach for each platform and a second multiplier.

16. The program carrier device of claim 14, wherein the fourth minimum value is based on how many well plans there are for each platform, a reach for each platform and a third multiplier.

17. The program carrier device of claim 10, wherein the list comprises one or two platforms in the project.

18. The program carrier device of claim 10, further comprising:
receiving input corresponding to a selection of a platform in the project to remove that is in the list and connects to a least number of targets.

* * * * *